United States Patent
Nilsson et al.

(10) Patent No.: US 9,264,110 B2
(45) Date of Patent: *Feb. 16, 2016

(54) ENHANCED RANK FOR OUTDOOR TO INDOOR COVERAGE

(75) Inventors: Andreas Nilsson, Gothenburg (SE);
Henrik Asplund, Stockholm (SE);
Mikael Coldrey, Landvetter (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 27 days.

This patent is subject to a terminal disclaimer.

(21) Appl. No.: 14/236,661

(22) PCT Filed: Jul. 10, 2012

(86) PCT No.: PCT/EP2012/063514
§ 371 (c)(1),
(2), (4) Date: Feb. 3, 2014

(87) PCT Pub. No.: WO2013/017380
PCT Pub. Date: Feb. 7, 2013

(65) Prior Publication Data
US 2014/0206280 A1    Jul. 24, 2014

(30) Foreign Application Priority Data
Aug. 4, 2011 (WO) ............... PCT/EP2011/063472

(51) Int. Cl.
*H04B 7/02* (2006.01)
*H04B 7/04* (2006.01)
(Continued)

(52) U.S. Cl.
CPC ............. *H04B 7/026* (2013.01); *H04B 7/0413* (2013.01); *H04B 7/0486* (2013.01); *H04B 7/15* (2013.01);
(Continued)

(58) Field of Classification Search
CPC . H04B 7/18539; H04B 7/2606; H04W 16/26; H01Q 3/2605
USPC ......... 455/13.1, 16, 63.2, 63.4; 343/830, 862, 343/723
See application file for complete search history.

(56) References Cited

U.S. PATENT DOCUMENTS

| 4,866,732 A | 9/1989 | Carey et al. |
| 8,396,368 B2 * | 3/2013 | Tarlazzi et al. ............... 398/115 |

(Continued)

FOREIGN PATENT DOCUMENTS

WO    2009015101 A1    1/2009

OTHER PUBLICATIONS

Cho, B.Y., et al., "Practical Scheme to Enable MIMO Communications in Distributed Antenna Systems for Efficient Indoor Coverage", Communications and Information Technology, 2009, ISCIT 2009, 9th International Symposium on, IEEE, Piscataway, NJ, USA, Sep. 28, 2009, pp. 25-28, XP031571371.

(Continued)

*Primary Examiner* — Minh D Dao
(74) *Attorney, Agent, or Firm* — Rothwell, Figg, Ernst & Manbeck, P.C.

(57) ABSTRACT

The invention relates to a wireless outdoor-indoor multiple-input multiple-output (MIMO) communications system for communicating with user equipment located inside a physical structure such as a building. The MIMO communication system is comprised of a node having at least two node antennas, wherein the node is configured for line of sight (LOS) wireless MIMO communication with at least two outdoor-indoor repeaters, and of at least two outdoor-indoor repeaters adapted for LOS wireless MIMO communication with the node. The repeaters have at least one repeater antenna each, provided outside the physical structure, for LOS MIMO communication with the node and at least two DASs each, provided inside the physical structure, for indoor MIMO communication with the user equipment located inside the physical structure. The repeaters are provided outside on the same physical structure and spaced well-apart, and each DAS of each repeater is provided such that they provide the same indoor coverage of the same interior space in the physical structure.

8 Claims, 5 Drawing Sheets

(51) Int. Cl.
*H04B 7/26* (2006.01)
*H04W 16/26* (2009.01)
*H04B 7/15* (2006.01)
*H04B 7/155* (2006.01)
*H04B 5/00* (2006.01)
*H04B 7/10* (2006.01)

(52) U.S. Cl.
CPC .......... *H04B 7/15514* (2013.01); *H04B 7/2606* (2013.01); *H04W 16/26* (2013.01); *H04B 5/0018* (2013.01); *H04B 7/10* (2013.01)

(56) References Cited

U.S. PATENT DOCUMENTS

| | | | |
|---|---|---|---|
| 8,744,504 B2* | 6/2014 | Faccin et al. | 455/507 |
| 2006/0209752 A1* | 9/2006 | Wijngaarden | H04W 4/04 370/328 |
| 2009/0061939 A1 | 3/2009 | Andersson et al. | |
| 2009/0175214 A1 | 7/2009 | Sfar et al. | |
| 2010/0291949 A1* | 11/2010 | Shapira | G01S 19/48 455/456.1 |
| 2011/0009056 A1* | 1/2011 | Hanson et al. | 455/9 |
| 2011/0124347 A1 | 5/2011 | Chen et al. | |
| 2012/0315916 A1* | 12/2012 | Van Phan et al. | 455/442 |
| 2013/0028194 A1* | 1/2013 | Chun et al. | 370/328 |
| 2013/0128832 A1* | 5/2013 | Kang et al. | 370/329 |
| 2013/0162500 A1* | 6/2013 | Coldrey et al. | 343/904 |
| 2014/0169263 A1* | 6/2014 | Stapleton | 370/315 |
| 2014/0170966 A1* | 6/2014 | Nilsson et al. | 455/14 |

OTHER PUBLICATIONS

Mouhamadou, M., et al, "Multi-Band Diversity Antenna Performances Evaluation for Multi-Standard Compact Wireless Terminal", 3rd European Conference on Antennas and Propagation, EUCAP 2009, Mar. 23-27, 2009, Berlin, Germany, IEEE, Piscataway, NJ, USA, Mar. 23, 2009, pp. 1602-1607, XP031470094.

Coldrey, M., et al., "Higher Order MIMO Outdoor-to-Indoor Measurements Using Repeaters", 2010 IEEE Vehicular Technology Conference (VTC 2010-Spring), May 16-19, 2010, Taipei, Taiwan, IEEE, US, May 16, 2010 pp. 1-5, XP031696336.

Office Action issued on Jul. 8, 2015 in U.S. Appl. No. 14/236,651, 17 pages.

* cited by examiner

Configure the node antennas and the repeater antennas for dual-polarization communication. — 501

Fig. 5a

Configure the DASs for dual-polarization communication. — 502

Fig. 5b

Configure each repeater to comprise the same number of DASs as the number of repeater antennas. — 503

Fig. 5c

ENHANCED RANK FOR OUTDOOR TO INDOOR COVERAGE

CROSS-REFERENCE TO RELATED APPLICATIONS

This application is a 35 U.S.C. §371 National Phase Entry Application from PCT/EP2012/063514, filed Jul. 10, 2012, and designating the United States, which claims priority to International Application No. PCT/EP2011/063472, filed Aug. 4, 2011, which published as WO 2013017175. The above identified applications and publication are each incorporated by reference.

TECHNICAL FIELD

The present invention relates to the field of wireless communication systems and, in particularly, to outdoor-indoor multiple-input multiple-output (MIMO) communication systems utilizing distributed antenna systems (DAS) for communicating with user equipment located inside a physical structure such as a building.

BACKGROUND

A large part of today's traffic load in wireless communication comes from users inside physical structures such as office buildings, shopping malls, cafés and restaurants, etc. Providing these indoor users with good coverage, high bit-rate and spectrally efficient communication from outside base stations is very challenging due to, for example, the penetration loss that occurs when the communication signals propagates through the walls of the building.

A well-known solution for enhancing communication signals inside a building is to use outdoor-indoor repeaters. An outdoor-indoor repeater has a pick-up antenna placed on the outside of the building connected via a double-directional power amplifier to a donor antenna placed on the inside of the building. Thus, signals from the base station are received by the pick-up antenna on the outside of the building, where the signal level is high, and then the signals are re-radiated inside the building by the donor antenna, and thereby circumventing the penetration loss. In a similar manner, communication signals from user equipment (UE), such as mobile phones and portable computer equipment, inside the building are received by the donor antenna located inside the building, and re-radiated by the pick-up antenna on the outside of the building. Typically, the pick-up antenna of the repeater on the outside of the building is placed in line of sight (LOS) of the base station antenna to ensure good link quality.

A well-known way of improving spectral efficiency in a wireless communications system is to utilize a multiple-input multiple-output (MIMO) communication system. Provided that both transmitter and receiver uses more than one antenna (e.g. K transmit antennas and M receive antennas), and that the channels between different pairs of transmit and receive antennas have similar power and can be made orthogonal, gains in spectral efficiency on the order of min(M,K) are possible to achieve. To allow indoor users communicating via a repeater to fully benefit from MIMO gains there needs to be at least as many repeater antennas as there are antennas at the base station.

Outdoor-indoor MIMO repeaters ensure good indoor coverage which implies high signal strengths. However the indoor coverage is typically limited to the close vicinity of the repeater donor antennas which usually are co-located with the repeater itself. Furthermore, as mentioned above, there is usually LOS between the base station and the repeater pick-up antennas in order to ensure a good link quality for the desired communication signals, and it is well known in the art that it is hard to achieve MIMO channels of more than rank two in a LOS environment since the spatially separated antennas will experience high correlation. Achieving sufficiently low correlation in a LOS environment might require a very large spatial separation of the repeaters antenna elements, which might make it difficult to co-locate the indoor donor antennas with the repeater and the pick-up antennas. Having non co-located donor antennas could lead to severe power imbalances between the donor antennas when for instance communicating with user equipment closer to one of the donor antennas, which in its turn will result in lower MIMO gains.

Thus, finding a way to offer good indoor coverage with high bit-rate and spectrally efficient communication is therefore highly sought for.

SUMMARY OF THE INVENTION

With the above description in mind, then, an aspect of the present invention is to provide a wireless communications system which seeks to mitigate, alleviate, or eliminate one or more of the above-identified deficiencies in the art and disadvantages singly or in any combination.

A first aspect of the present invention relates to a wireless MIMO communications system for communicating with user equipment located inside a physical structure.

Any of the features in the second aspect of the present invention above may be combined, in any way possible, as to form different embodiments of the present invention. All of the benefits described in conjunction with the first aspect of the present invention may in the same way be applied to the second aspect of the present invention.

BRIEF DESCRIPTION OF THE DRAWINGS

Further objects, features, and advantages of the present invention will appear from the following detailed description of some embodiments and variants of the invention, wherein some embodiments or variants of the invention will be described in more detail with reference to the accompanying drawings, in which:

FIG. 5a-5c shows a collection of flowcharts describing different embodiments and variations of the present invention.

DETAILED DESCRIPTION

Figure 1:
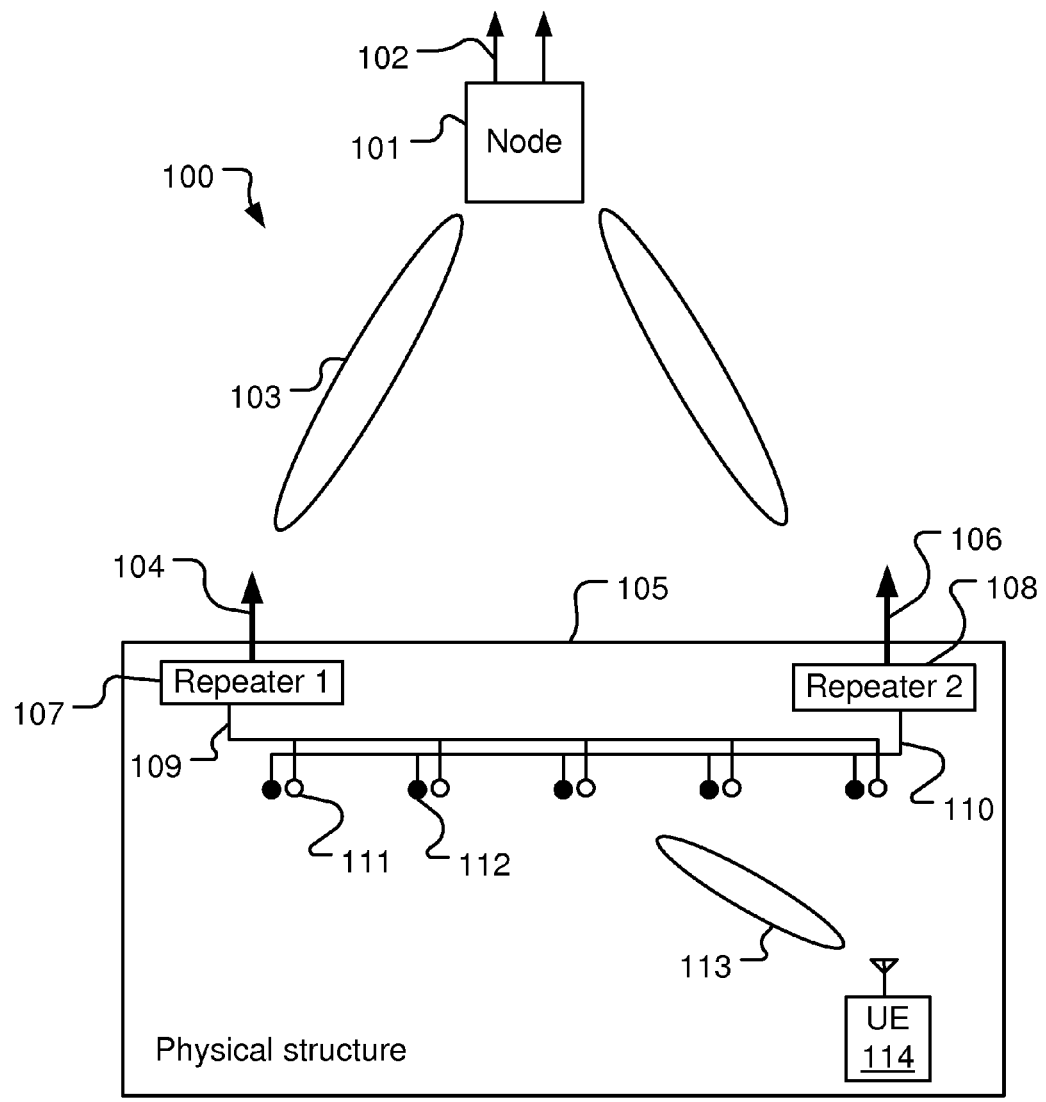
FIG. 1 shows a block diagram of a wireless outdoor-indoor MIMO communications system, employing multiple MIMO repeaters and multiple DASs, for communicating with user equipment located inside a physical structure, according to an embodiment of the present invention.

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference signs refer to like elements throughout the description.

A way of offering good indoor coverage along with high bit-rate and spectrally efficient communication is to utilize a wireless outdoor-indoor MIMO communications system 100 according to an embodiment of the present invention. The wireless outdoor-indoor MIMO communications system 100, shown in FIG. 1, comprise of a node 101, and at least two node antennas 102, adapted for wireless MIMO communication. The term node will be used through out the description of the different embodiments and variants of the present invention, and should be interpreted as to include any type of wireless communication redistribution point, such as a base station, or endpoint, such as user equipment. The node 101 may further be configured for line-of-sight (LOS) MIMO communication over a first radio channel 103 with at least two outdoor-indoor repeaters 107,108.

The outdoor-indoor repeaters 107,108 in FIG. 1 may be adapted for LOS MIMO and/or for non-LOS MIMO communication over the first radio channel 103 with at least one node 101 having at least two node antennas 102. Each repeater 107,108 may have at least one repeater antenna 104,106 being adapted to receive and to transmit communication signals to and from said node 101 over the first radio channel 103. The outdoor-indoor repeaters 107,108 are usually placed in close proximity to the repeater antennas 104, 106 on the outer side or on the inner side of the physical structure 105 in which the repeaters are going to provide indoor coverage. Usually the repeater antennas 104, 106 are placed or mounted on the outer wall, the façade, of the physical structure 105 in close proximity to the repeaters, in order to minimize cable losses and for reducing installation costs, and typically in LOS of said node antennas 102 in order to maximize the signal strength of the communication signals transmitted between the antennas 102,104,106 over the first radio channel 103.

The physical structure 105 may be any type of man made structure such as a multi-storage building having several interior spaces (such as rooms, hallways, etc.) of different sizes and shapes, to a small house-like building containing only one interior space (one room). The term physical structure 105 should also be interpreted to include any man-made or any non man-made underground structure such as a mine, cave or the like.

The repeaters 107,108 may be mounted either on the outer walls or the inner walls (or both) of the physical structure 105. The repeaters 107,108 provide a connection via a double-directional power amplifier between the repeater antennas 104,106, mounted on the outside of the physical structure 105, and the donor antennas 109,110 mounted inside of the physical structure 105.

In the embodiment of the present invention the at least two outdoor-indoor repeaters 107,108, adapted for LOS MIMO communication over a first radio channel 103 with said node 101 and having at least one repeater antenna each 104,106, are provided inside a physical structure 105. Preferably, the repeaters are spaced well-apart, usually ranging from several meters up to over 100 meters, and spaced such that the first radio channel 103 between the node 101 and the repeaters 107,108 support a rank that is equal to the number of repeater antennas 104, 106. The separation distance between the repeaters will of cause depend on parameters such as the size of the building, the possibility of having LOS to the node 101, etc. By spatially separating the repeaters and the repeater antennas well-apart, the correlation between them will drastically be reduce despite being implemented in a LOS environment, and thus making it possible to support a rank that is equal to the number of repeater antennas.

The donor antennas 109,110 may be implemented using any type of distributed antenna system. A distributed antenna system (DAS) 109,110 is typically a network of spatially separated antenna nodes 111,112 connected to a common source such as a repeater 107,108 which via a radio channel (in this case a second radio channel) provide wireless service within an interior space inside said physical structure 105.

The at least two repeaters 107,108 are implemented, according to the embodiment of the present invention, with at least one DAS 109,110 connected to each repeater 107,108, provided inside the physical structure 105, adapted for indoor MIMO communication over a second radio channel 113 with user equipment (UE) 114 located inside said physical structure 105. The DASs 109,110 are provided such that said second radio channel 113 between the repeaters 107,108 and user equipment 114 located inside said physical structure 105 support a rank that is equal to the number of repeater antennas 104,106. The UE 114 may be any type of equipment capable of communicating wirelessly such as mobile phones and computer equipment (i.e. laptops, tabletop computers, pads, etc.). The UE 114 may be stationary in said interior space in the physical structure 105 or it may be capable of moving (i.e. mobile) between different interior spaces inside the physical structure 105. The UE 114 may or may not be adapted for MIMO communication with the DASs 109,110 over the second radio channel 113. Each DASs 109,110 of each repeater 107,108 are provided such that they provide essentially the same unified indoor coverage of essentially the same interior space in said physical structure 105. The term "essentially" should be interpreted as meaning both "exactly the same" and "close to, but not exactly the same", since in reality it may be difficult to achieve exactly the same coverage of an interior space. By employing DASs covering essentially the same interior space the power imbalance in the MIMO channel that would occur in a traditional repeater setup with ordinary donor antennas are virtually avoided. Another benefit with using DASs is that they provides a more uniform coverage in the interior space that it is implemented to cover in comparison with a traditional point-source antenna from which the coverage falls with a factor $1/r^2$ or faster.

The DAS antennas 109,110 could in a variant be adapted for using orthogonal polarizations. In the case that the DASs 109,110 experience additional longitudinal loss it is possible to compensate by using bi-directional power amplifiers at certain positions along the DASs.

The first radio channel 103 and the second radio channel 113 mentioned above may be different radio channels or it may be the same radio channel, depending on the set up of the system and choice of equipment.

By employing the system shown in FIG. 1 all objectives of the invention are fulfilled due to the fact that the first radio channel 103 is full rank, the second radio channel 113 is also full rank (due to the diversity from the two DASs), and the second radio channel 113 is power balanced due to the equal coverage from the two DAS antennas 109,110. It may be of importance in some scenarios that the power splitters and feeder losses are balanced between the two DASs such that the output power at each pair of antennas 111,112 is balanced across the two repeater 107,108 ports. Variants using active components such as power amplifiers or RF-opto converters in combination with a fibre optic distribution network can also be envisaged.

By employing the wireless outdoor-indoor MIMO communications system 100 as described above in conjunction with the description of FIG. 1, the object of the present invention will be fulfilled in that the communication system 100 provides indoor users with good coverage, high bit-rate and spectrally efficient communication from an outside base station. It is clear that with the presented communication system 100 a higher MIMO rank can be achieved compared to the traditional way of having repeaters with co-located pick-up antennas, as well as compared to repeaters with non-co-located donor antennas. The invention combines well-separated repeater antennas with DASs covering essentially the same interior space which together will, with a high probability, give excellent higher-order MIMO indoor coverage over a large area.

Another advantage of the present invention is that presented communication system 100 improves the channel rank for the case of multi-stream transmissions in combination with outdoor-indoor repeaters. This will increase the spatial multiplexing gains for indoor users in communication with an outdoor base station via such repeaters, and lead among other things to improved user bitrates. As the majority of high data rate-users currently are and are expected to be (also in the future) indoor users, such improvements are especially desirable. Thus, the object of the present invention is therefore fulfilled.

Figure 2:
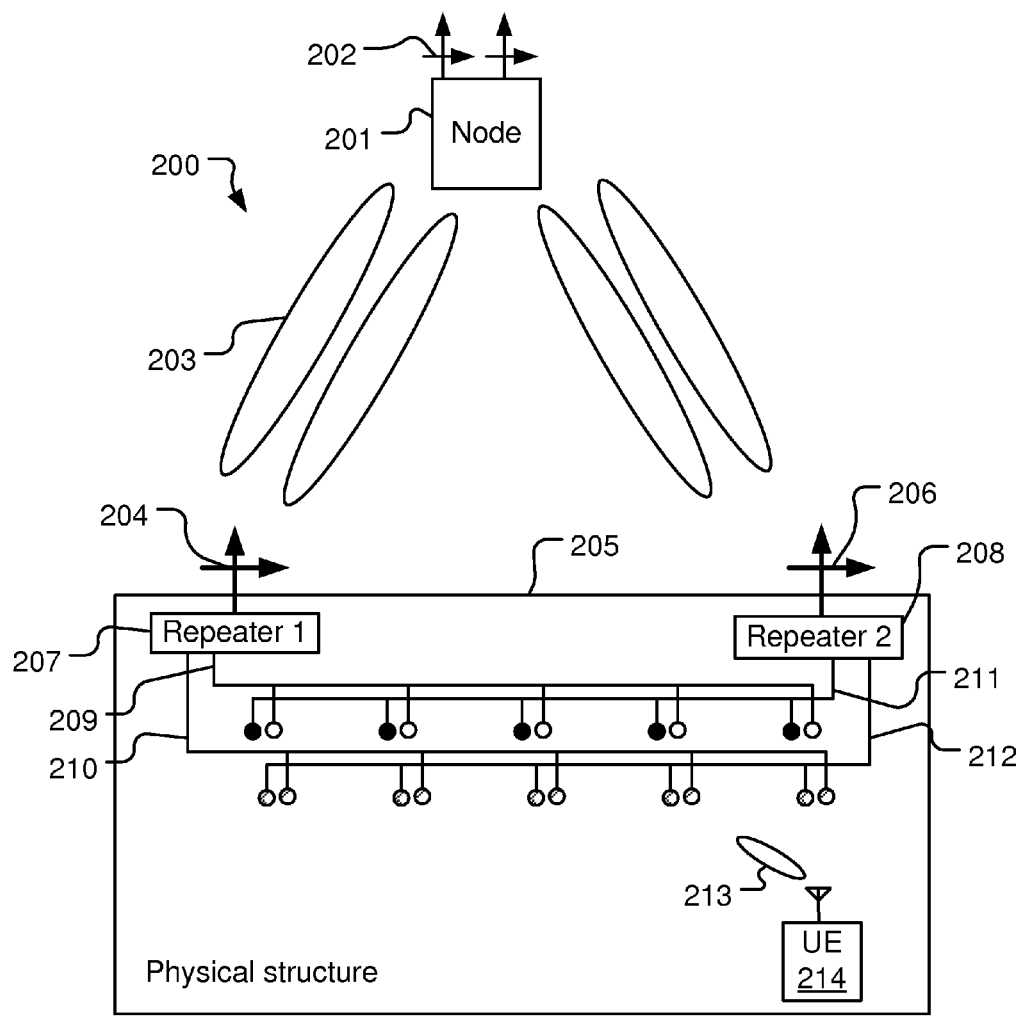
FIG. 2 shows a block diagram of a wireless outdoor-indoor MIMO communications system, employing multiple MIMO repeaters with dual-polarization and multiple DASs, for communicating with user equipment located inside a physical structure, according to an embodiment of the present invention.

FIG. 2 shows a variant of the embodiment presented in conjunction with FIG. 1. In the variant the wireless outdoor-indoor MIMO communications system 200 is comprised of a node 201 having two dual-polarized node antennas 202 adapted for wireless LOS MIMO communication with two repeaters 207,208 having dual-polarized repeater antennas 204,206 mounted well separated on a physical structure 205. Each repeater 207,208 is connected to two DASs, repeater 1 207 to DAS 209 and 210 and repeater 2 to DAS 211 and 212, wherein each pair of DASs either covering essentially the same interior space in the physical structure 205, or in a variant covering essentially the same interior space in the physical structure 205. The DASs 209,210,211,212 are configured to communicate with UE 214 inside said physical structure 205. The communication system 200 shown in FIG. 2 is not limited to using a node with only two dual-polarized node antennas and two repeaters employing one dual-polarized repeater antenna and two DASs each, but may be extended to employ several node antennas (dual-polarized or not) and several repeaters having multiple repeater antennas (dual-polarized or not) and DASs. The main benefit with employing dual polarized antennas and multiple DASs, is that the capacity of the communications system may in that way be extended from a 2-by-2 MIMO system to a 4-by-4 MIMO system.

The communication system 200 in FIG. 2 can also be realized using the communication system 100 setup in FIG. 1, but using two dual-polarized DASs.

The repeaters 107,108 in FIG. 1 do not necessarily have to be placed close to the repeater antennas 104,106. As long as the repeater antennas 104,106 are spaced well apart the repeaters could be placed anywhere. However, the closer the repeaters are to the pick-up antennas the better performance could typically be expected due to reduced cable loss.

Figure 3:
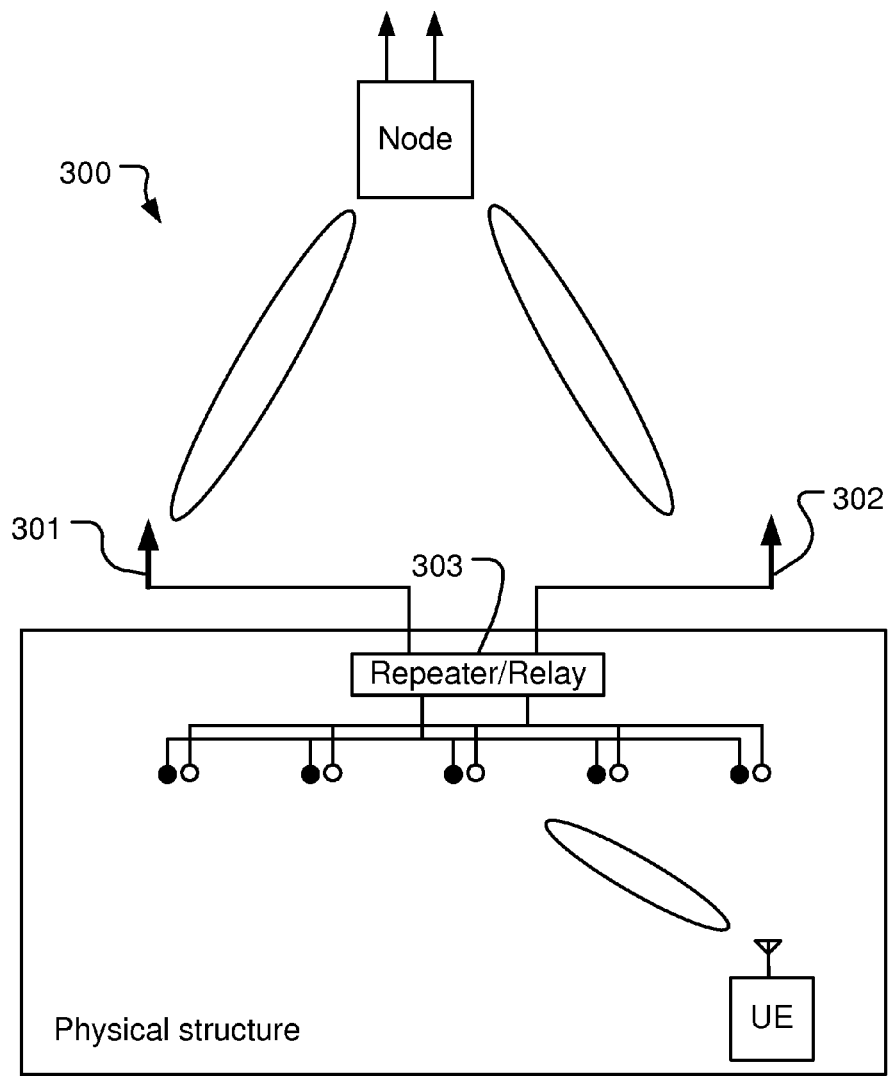
FIG. 3 shows a block diagram of a wireless outdoor-indoor MIMO communications system, employing one repeater with two antenna ports connected to two DASs, for communicating with user equipment located inside a physical structure, according to an embodiment of the present invention.

FIG. 3 shows yet another variant of the embodiment described in conjunction with FIG. 1. In the communication system 300 shown in FIG. 3 only one repeater 303 having two antenna ports is used. The repeater antennas 301, 302 are spaced well apart but at a distance from the single repeater 303. The single repeater 303 may in this variant be exchanged to a relay. However, the functionality of the communication system 300 in FIG. 3 is the same as the functionality of the communication system 100 in FIG. 1.

Figure 4:
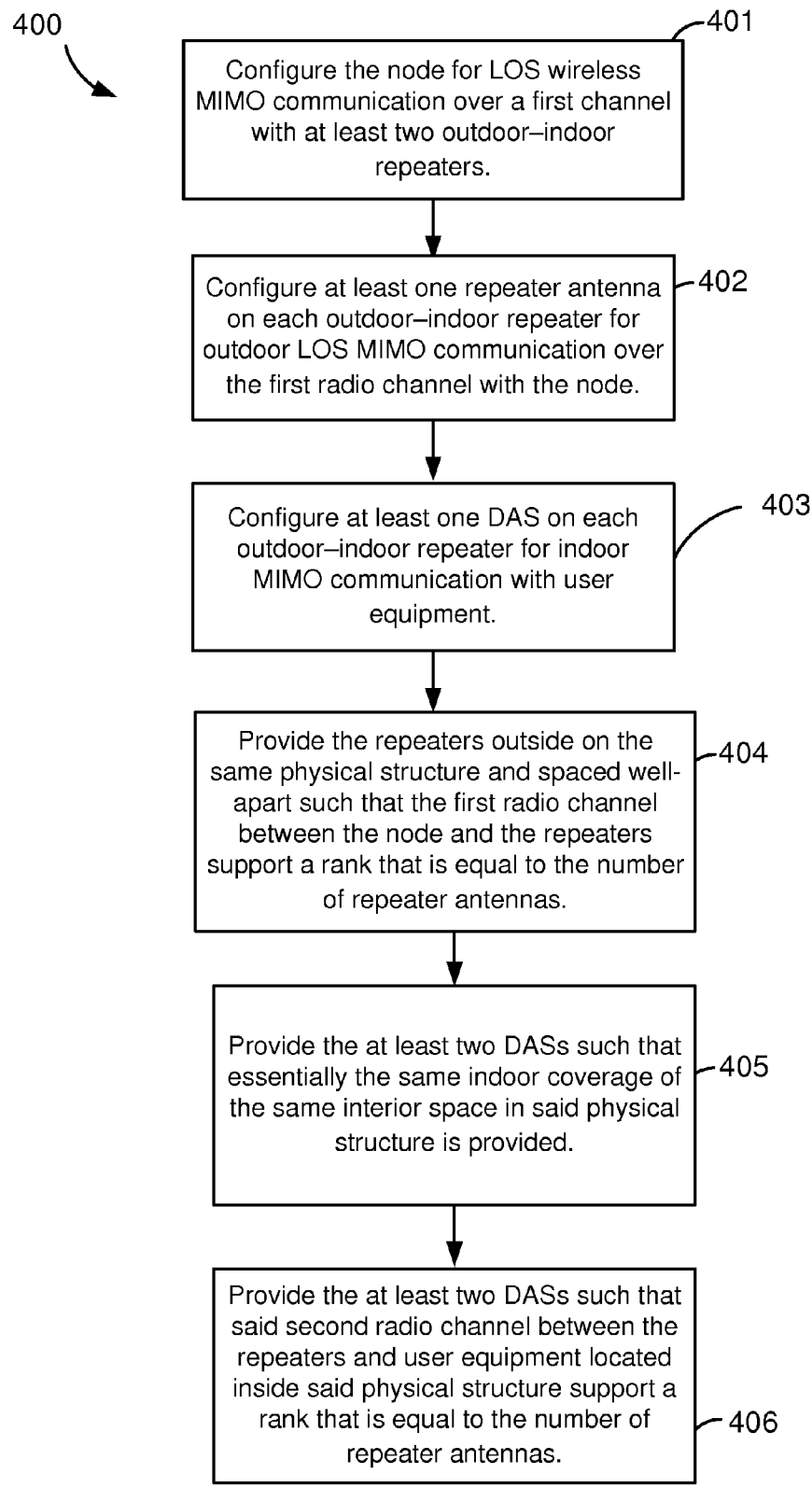
FIG. 4 shows a flowchart describing one way of how the present invention may be employed.

FIG. 4 shows a flowchart describing the main steps in a method for providing LOS wireless MIMO communication 400 between a node, located outside a physical structure, and user equipment, located inside said physical structure. The method comprises the steps of;

I) configuring 401 said node for LOS wireless MIMO communication with at least two outdoor-indoor repeaters provided outside said physical structure;

II) configuring 402 at least one repeater antenna on each said outdoor-indoor repeater, located outside said physical structure, for outdoor LOS MIMO communication with said node; and III) configuring 403 at least one DAS coupled to each said outdoor-indoor repeater, located inside said physical structure, for indoor MIMO communication with said user equipment located inside said physical structure; and IV) providing 404 the repeaters outside on the same physical structure and spaced well-apart such that the first radio channel between the node and the repeaters support a rank that is equal to the number of repeater antennas; and V) providing 405 the at least two DASs such that they essentially have the same indoor coverage of the same interior space in said physical structure is provided; and VI) providing 406 the at least two DASs such that said second radio channel between the repeaters and user equipment located inside said physical structure support a rank that is equal to the number of repeater antennas.

As described in the above embodiments of the present invention it is important that the repeaters are provided on the same physical structure but spaced well-apart (such that the first radio channel between the node and the repeaters support a rank that is equal to the number of repeater antennas), if possible spacing them several meters apart, and that each DAS of each repeater is provided such that the second radio channel between the repeaters and user equipment located inside said physical structure support a rank that is equal to the number of repeater antennas and such that they provide essentially the same indoor coverage of essentially the same interior space in said physical structure. An example of this could for instance be to run one DAS along one wall in a corridor and run the other DAS on the opposite wall in the corridor. Another way would be to run both DASs close to the ceiling but spaced apart.

FIGS. 5a to 5c shows three flowcharts with three optional enhancements or variations to the main method described in the flowchart 400 in FIG. 4.

As described in the flowchart in FIG. 5a the method may optionally comprise the step of configuring 501 said node antennas and said repeater antennas for dual-polarization communication.

As described in the flowchart in FIG. 5b the method may optionally comprise the step of configuring 502 said DASs for dual-polarization communication. This optional step may preferably be implemented together with the optional step 501 discussed in FIG. 5a.

As described in the flowchart in FIG. 5c the method may optionally comprise the step of configuring 503 said each repeater to comprise the same number of DASs as the number of repeater antennas.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles, preferred embodiments and modes of operation of the present invention. However, the invention should be regarded as illustrative rather than restrictive, and not as being limited to the particular embodiments discussed above. The different features of the various embodiments of the invention can be combined in other combinations than those explicitly described. It should therefore be appreciated that variations may be made in those embodiments by those skilled in the art without departing from the scope of the present invention as defined by the following claims.

The invention claimed is:

1. A wireless outdoor-indoor multiple-input multiple-output (MIMO) communication system for communicating with a user equipment located inside a physical structure, comprising:
   a node comprising at least two node antennas; and
   at least two repeater having at least one repeater antenna each, said repeaters being located outside said physical structure, wherein said repeaters are each connected to at least one distributed antenna system (DAS) located inside said physical structure (110), wherein
   said repeaters are adapted for LOS MIMO communication with said node over a first radio channel,
   said repeaters are located outside on the same physical structure and spaced well-apart such that the first radio channel between the node and the repeaters support a rank that is equal to the number of repeater antennas, and
   said at least two DASs are provided such that essentially the same indoor coverage of the same interior space in said physical structure is provided from each repeater, and adapted for indoor MIMO communication over a second radio channel with user equipment located inside said physical structure.

2. The wireless communication system according to claim 1, wherein said first radio channel and said second radio channel are the same radio channel.

3. The wireless communication system according claim 1, wherein said node antennas and said repeater antennas are dual-polarized antennas.

4. The wireless communication system according to claim 1, wherein said DASs are dual-polarized DASs.

5. A method for providing wireless MIMO communication between a node, located outside a physical structure, and user equipment, located inside said physical structure, the method comprising:
   configuring said node for LOS wireless MIMO communication over a first radio channel with at least two repeaters located outside said physical structure;
   configuring at least one repeater antenna on each said repeater, located outside said physical structure, for outdoor LOS MIMO communication over said first radio channel with said node;
   configuring at least one DAS on each said repeater, located inside said physical structure;
   providing said repeaters outside on the same physical structure and spaced well-apart such that the first radio channel between the node and the repeaters support a rank that is equal to the number of repeater antennas; and
   providing at least two DASs, adapted for indoor MIMO communication over a second radio channel with user equipment located inside said physical structure.

6. The method according to claim 5, further comprising configuring said node antennas and said repeater antennas for dual-polarization communication.

7. The method according to claim 5, further comprising configuring said DASs for dual-polarization communication.

8. The method according to claim 5, further comprising configuring said each repeater to comprise the same number of DASs as the number of repeater antennas.

* * * * *

UNITED STATES PATENT AND TRADEMARK OFFICE
CERTIFICATE OF CORRECTION

| | | |
|---|---|---|
| PATENT NO. | : 9,264,110 B2 | Page 1 of 1 |
| APPLICATION NO. | : 14/236661 | |
| DATED | : February 16, 2016 | |
| INVENTOR(S) | : Nilsson et al. | |

It is certified that error appears in the above-identified patent and that said Letters Patent is hereby corrected as shown below:

In the Specification

In Column 2, Line 50, delete "invention; and" and insert -- invention; --, therefor.

In Column 2, Lines 55-56, delete "invention; and" and insert -- invention; --, therefor.

In Column 2, Lines 61-62, delete "invention; and" and insert -- invention; --, therefor.

In Column 2, Line 65, delete "FIG. 5a-5c shows a" and insert -- FIGS. 5a-5c show a --, therefor.

In Column 6, Line 20, delete "node; and" and insert -- node; --, therefor.

In Column 6, Line 24, delete "structure; and" and insert -- structure; --, therefor.

In Column 6, Line 28, delete "antennas; and" and insert -- antennas; --, therefor.

In Column 6, Line 52, delete "shows" and insert -- show --, therefor.

In the Claims

In Column 7, Line 42, in Claim 1, delete "structure (110) ," and insert -- structure, --, therefor.

In Column 8, Line 12, in Claim 3, delete "according claim" and insert -- according to claim --, therefor.

Signed and Sealed this
Fourteenth Day of June, 2016

Michelle K. Lee
*Director of the United States Patent and Trademark Office*